(12) United States Patent
Tashiro

(10) Patent No.: US 11,281,146 B1
(45) Date of Patent: Mar. 22, 2022

(54) IMAGE FORMING APPARATUS WITH IMPROVED DEVELOPMENT

(71) Applicant: TOSHIBA TEC KABUSHIKI KAISHA, Tokyo (JP)

(72) Inventor: Hiroki Tashiro, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/133,710

(22) Filed: Dec. 24, 2020

(51) Int. Cl.
*G03G 15/00* (2006.01)
*G03G 15/08* (2006.01)
*G03G 15/01* (2006.01)
*G06T 7/00* (2017.01)

(52) U.S. Cl.
CPC ..... *G03G 15/5058* (2013.01); *G03G 15/0121* (2013.01); *G03G 15/0848* (2013.01); *G03G 15/0887* (2013.01); *G03G 15/5062* (2013.01); *G03G 15/55* (2013.01); *G06T 7/0002* (2013.01); *G03G 2215/00059* (2013.01); *G06T 2207/30168* (2013.01)

(58) Field of Classification Search
CPC .......... G03G 15/0848; G03G 15/0887; G03G 15/0889; G03G 15/5054; G03G 15/5058; G03G 15/5062; G03G 15/55; G03G 15/556; G03G 2215/00029–00059; G06T 7/0002; G06T 2207/30168
See application file for complete search history.

(56) References Cited

U.S. PATENT DOCUMENTS

| | | | | |
|---|---|---|---|---|
| 5,387,967 | A | * 2/1995 | Brewington | ....... G03G 15/0812 399/273 |
| 2005/0024393 | A1 | * 2/2005 | Kondo | ................... G03G 15/65 347/2 |
| 2015/0110514 | A1 | * 4/2015 | Mori | ...................... H04N 1/047 399/74 |
| 2017/0177962 | A1 | 6/2017 | Yamazaki | |
| 2018/0150010 | A1 | 5/2018 | Sone et al. | |
| 2018/0239290 | A1 | 8/2018 | Tomii | |

FOREIGN PATENT DOCUMENTS

| | | |
|---|---|---|
| JP | 06-303428 | 10/1994 |
| JP | 2011123261 A * | 6/2011 |
| JP | 2014-134673 | 7/2014 |

OTHER PUBLICATIONS

Machine Translation of JP2011-123261. Jun. 2011. (Year: 2011).*

* cited by examiner

*Primary Examiner* — Carla J Therrien
(74) *Attorney, Agent, or Firm* — Amin, Turocy & Watson, LLP

(57) ABSTRACT

An image forming apparatus according to one embodiment includes an image carrier that moves in a first direction, a developing device, a detector, and a determination unit. The developing device uses a developer on the surface of the image carrier to forma strip-shaped image inclined with respect to the width direction perpendicular to the moving direction of the image carrier. The detector detects the density difference occurring in the strip-shaped image formed on the surface of the image carrier while moving in the width direction. The determination unit determines based on a detection result by the detector whether or not there is an abnormality.

14 Claims, 11 Drawing Sheets

| LINE NUMBER Ln | TONER DENSITY D |
|---|---|
| 1 | |
| 2 | |
| 3 | |
| ⋮ | ⋮ |
| Lmax | |

300

131

1311 DIAGNOSIS CONTROL UNIT
1312 MEASUREMENT UNIT
1313 DETERMINATION UNIT

IMAGE FORMING APPARATUS WITH IMPROVED DEVELOPMENT

FIELD

Embodiments described herein relate generally to image forming apparatuses.

BACKGROUND

An image forming apparatus using an electrophotographic process is known as a printer, a copying machine, a multifunction peripheral (MFP), and the like. This type of image forming apparatus includes an image carrier, a charging unit, an exposing unit, a developing unit, a transfer unit, a fixing unit, and the like. The image forming apparatus performs charging, exposing, developing, and transferring processes on a surface of the image carrier by the charging unit, the exposing unit, the developing unit, and the transfer unit. Then, the image forming apparatus fixes an image transferred to a transfer body in a fixing process by the fixing unit to perform image formation.

In such a process, a developing device is used for developing. The developing device includes a container containing a developer containing toner and a carrier and a developing roller that carries the developer on the surface by rotating in the container. The developing device develops the developer carried on the developing roller by adhering the developer to a latent image formed on the surface of the image carrier.

In some cases, due to the influence of a containing period or ambient temperature, humidity, or the like of surroundings, a sticking phenomenon so-called caking may occur in the developer contained in the container. If the caking occurs in the developer carried by the developing roller, the developer in the caking portion does not adhere to the image carrier, and there is a concern that a streak-shaped image is formed and the image quality deteriorates. It is desired to develop an image forming apparatus capable of efficiently resolving such deterioration in image quality.

DETAILED DESCRIPTION

In one embodiment, an image forming apparatus includes an image carrier that moves in a first direction, a developing device, a detector, and a determination unit. The developing device uses a developer on a surface of the image carrier to form a strip-shaped image inclined with respect to a second direction perpendicular to a moving direction of the image carrier. The detector detects a density difference occurring in the strip-shaped image formed on the surface of the image carrier while moving in the second direction. The determination unit determines based on a detection result by the detector whether or not there is an abnormality. In another embodiment, a method involves moving an image carrier in a first direction; forming a strip-shaped image inclined with respect to a second direction perpendicular to the first direction on a surface of the image carrier by using a developer; detecting a density difference occurring in different portions of the strip-shaped image formed on the surface of the image carrier while moving in the second direction; and determining that, based on a detection result, whether or not an abnormality exists.

Figure 1:
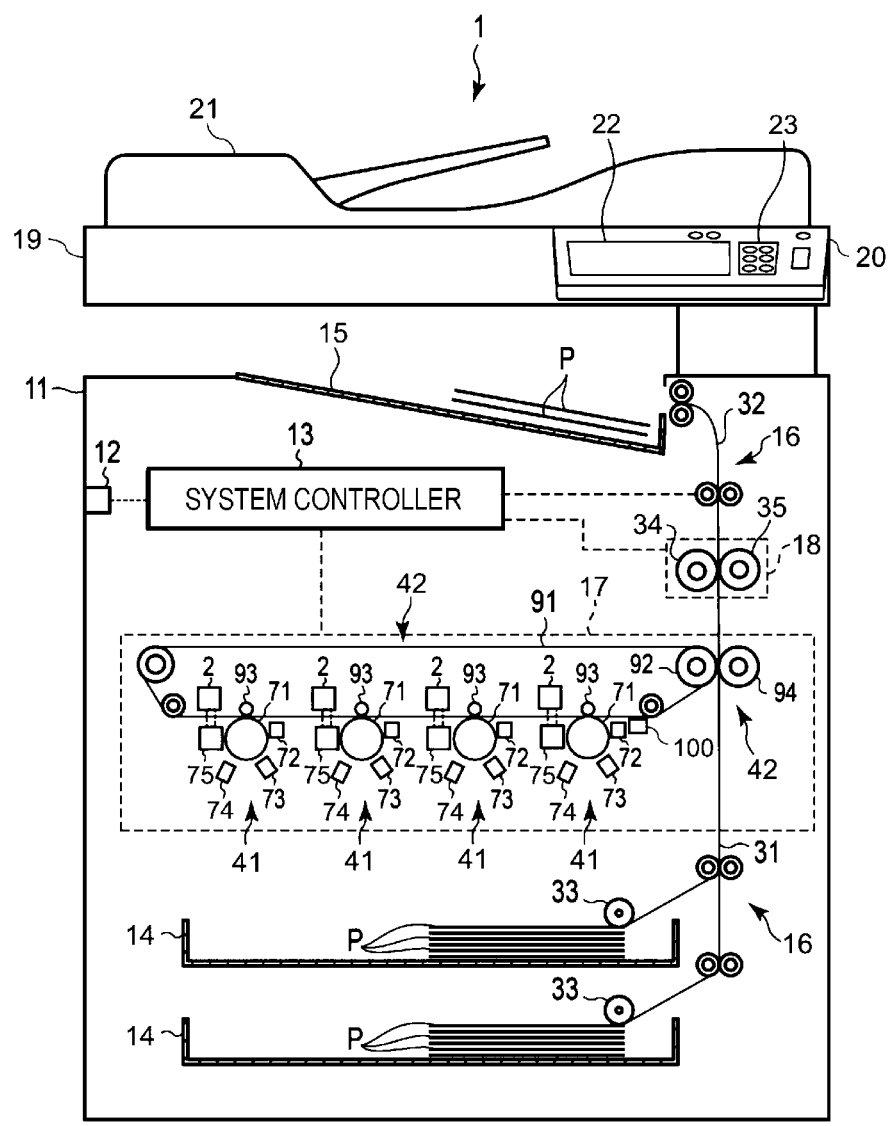
FIG. 1 is a schematic diagram illustrating a schematic configuration of an image forming apparatus according to an embodiment.

FIG. 1 is a schematic view illustrating a schematic configuration of an image forming apparatus 1 according to the embodiment.

The image forming apparatus 1 conveys a printing medium P and forms an image on the printing medium P by an electrophotographic process. The printing medium P is also referred to as a recording medium, a transfer body, paper, or the like. The image forming apparatus 1 receives toner from a toner cartridge 2 and forms the image on the printing medium P by the received toner. The toner may be a single color toner or may be a plurality of color toners such as yellow, magenta, cyan, and black. FIG. 1 illustrates a multifunction peripheral using four color toners as an example of the image forming apparatus 1.

As illustrated in FIG. 1, the image forming apparatus 1 includes a housing 11, a communication interface 12, a system controller 13, a plurality of paper trays 14, a paper discharge tray 15, a conveying unit 16, an image forming unit 17, a fixing unit 18, a scanner unit 19 and a control panel 20.

The housing 11 is a main body of the image forming apparatus 1. The housing 11 accommodates, for example, the communication interface 12, the system controller 13, the plurality of paper trays 14, the conveying unit 16, the image forming unit 17, the fixing unit 18, and the like. A portion of the upper surface of the housing 11 is used as the paper discharge tray 15.

The communication interface 12 is an interface for communicating with other devices connected via a network. The communication interface 12 is used for communication with an external device. The external device is, for example, a host device. The communication interface 12 is configured with, for example, a LAN connector or the like. The communication interface 12 may perform wireless communication with other devices according to a standard such as Bluetooth (registered trademark) or Wi-Fi (registered trademark).

The system controller 13 functions as a control unit of the image forming apparatus 1. The system controller 13 is connected to the communication interface 12. The system controller 13 generates a printing job based on, for example, data acquired from the external device via the communication interface 12. The printing job includes image data indicating the image formed on the printing medium P. The image data may be data for forming the image on one printing medium P or may be data for forming the image on a plurality of printing media P. The printing job may include information indicating whether the printing is color printing or monochrome printing.

The system controller 13 generating the printing job controls operations of the conveying unit 16, the image forming unit 17, and the fixing unit 18 and forms the image of the image data included in the printing job on the printing medium P. Specifically, the system controller 13 controls the conveying of the printing medium P by the conveying unit 16, the image formation on the printing medium P by the image forming unit 17, and the fixing of the image on the printing medium P by the fixing unit 18. As described above, the system controller 13 also has a function as an engine controller of the image forming apparatus 1.

The image forming apparatus 1 may be configured to include an engine controller separately from the system controller 13. In this case, the engine controller controls at least one of the conveying of the printing medium P by the conveying unit 16, the image formation on the printing medium P by the image forming unit 17, the fixing of the image on the printing medium P by the fixing unit 18, and the like. The system controller 13 supplies information required for control in the engine controller to the engine controller.

Each of the plurality of paper trays 14 is a cassette that contains the printing medium P. The paper tray 14 is configured so that the printing medium P can be supplied from the outside of the housing 11. For example, the paper tray 14 is configured to be retractable from the housing 11.

The paper discharge tray 15 is a tray that receives the printing medium P discharged from the image forming apparatus 1.

The conveying unit 16 is a mechanism that conveys the printing medium P in the image forming apparatus 1. As illustrated in FIG. 1, the conveying unit 16 includes a plurality of conveyance paths. Specifically, the conveying unit 16 includes a paper feed conveyance path 31 and a paper discharge conveyance path 32.

The paper feed conveyance path 31 and the paper discharge conveyance path 32 are configured with a plurality of rollers, a plurality of guides, and the like. The plurality of rollers convey the printing medium P by rotating by a power transmitted from a driving mechanism. The plurality of guides control the conveyance direction of the printing medium P conveyed by the rollers.

The paper feed conveyance path 31 takes the printing medium P from the paper tray 14 and supplies the taken printing medium P to the image forming unit 17. The paper feed conveyance path 31 includes a plurality of pickup rollers 33 corresponding to the respective paper trays 14. Each pickup roller 33 takes the printing medium P of the paper tray 14 into the paper feed conveyance path 31.

The paper discharge conveyance path 32 is a conveyance path that discharges the printing medium P on which the image is formed by the image forming unit 17 from the housing 11. The printing medium P discharged by the paper discharge conveyance path 32 is supported by the paper discharge tray 15.

The image forming unit 17 has a configuration for forming the image on the printing medium P. The details of the image forming unit 17 will be described later.

The fixing unit 18 includes a heating roller 34 and a pressing roller 35. The fixing unit 18 heats the printing medium P conveyed through the paper discharge conveyance path 32 at a predetermined temperature by the heating roller 34 and further presses the printing medium P by the pressing roller 35 to fix the image transferred to the printing medium P on the printing medium P.

The scanner unit 19 is a device that reads a document and converts the document into image data, and is installed on the upper portion of the housing 11. The scanner unit 19 includes an automatic document feeder 21 and also copes with reading documents conveyed by the automatic document feeder 21.

The control panel 20 includes a touch panel 22, a keyboard 23, and the like. The touch panel 22 is a stack of a display such as a liquid crystal display or an organic EL display and a touch sensor that detects touch input. As information to be notified to the user of the image forming apparatus 1, for example, an image for setting various functions of the image forming apparatus 1, an image illustrating a remaining amount of toner, and the like are displayed on the display.

The keyboard 23 includes various keys of the image forming apparatus 1 for the user to operate. For example, the keyboard 23 includes a numeric keypad, a power key, a paper feed key, function keys, and the like. Each key may be referred to as a button. In this manner, the touch panel 22 and the keyboard 23 function as input devices of the image forming apparatus 1. The display included in the touch panel 22 functions as a display device of the image forming apparatus 1.

Next, the image forming unit 17 will be described.

As illustrated in FIG. 1, the image forming unit 17 includes a plurality of processing units 41 and a transfer unit 42. Each processing unit 41 is a unit for forming a toner image. Each processing unit 41 is provided for each type of toner. For example, each processing unit 41 corresponds to each of color toners such as yellow, magenta, cyan, and black from the left side in FIG. 1. Each processing unit 41 includes the toner cartridge 2 having a color toner of each corresponding color. FIG. 1 illustrates the image forming apparatus 1 in which the image forming unit 17 includes four processing units 41 corresponding to four color toners of yellow, magenta, cyan, and black, respectively.

Figure 2:
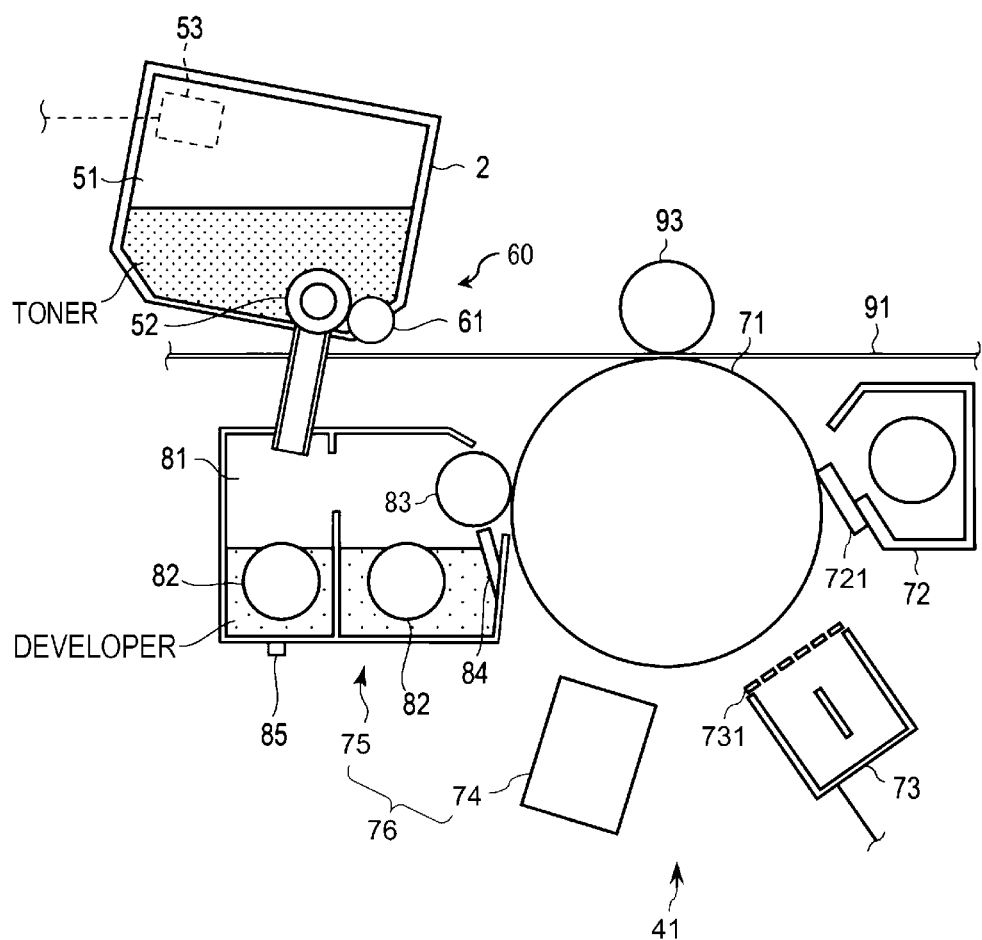
FIG. 2 is a schematic view illustrating a configuration of a main portion of an image forming unit of the image forming apparatus.

FIG. 2 is a schematic view illustrating a configuration of a main portion of the image forming unit 17. Each toner cartridge 2 and each processing unit 41 have the same configurations. Therefore, in FIG. 2, one toner cartridge 2 and one processing unit 41 are exemplified.

First, the toner cartridge 2 will be described. As illustrated in FIG. 2, the toner cartridge 2 includes a toner storage container 51, a toner delivery mechanism 52, and a memory 53.

The toner storage container 51 is a container that contains the toner. The toner delivery mechanism 52 is a mechanism that delivers the toner in the toner storage container 51. The toner delivery mechanism 52 is, for example, a screw provided in the toner storage container 51. By rotating the screw, the toner in the toner storage container 51 is delivered out.

The toner storage container 51 is loaded in a loading unit 60. The loading unit 60 is a module to which the toner cartridge 2 filled with the toner is attached. The loading unit 60 includes a toner supply motor 61. Further, the loading unit 60 includes a communication interface that connects the memory 53 of the toner cartridge 2 and the system controller 13.

When the toner cartridge 2 is loaded in the loading unit 60, the toner supply motor 61 is connected to the toner delivery mechanism 52 of the toner cartridge 2. The toner supply motor 61 drives the toner delivery mechanism 52 under the control of the system controller 13. When the toner supply motor 61 drives the toner delivery mechanism 52, the toner in the toner storage container 51 is supplied to a developing device 75, which will be described later. The memory 53 of the toner cartridge 2 stores information such as the number of times of supplying the toner to the developing device 75 by driving the toner delivery mechanism 52, the date and time of supply, and the like.

Next, the processing unit 41 will be described. As illustrated in FIG. 2, the processing unit 41 includes a photosensitive drum 71, a cleaner 72, a charging unit 73, an exposing device 74, and the developing device 75.

The photosensitive drum 71 is a photosensitive body including a cylindrical drum and a photosensitive layer formed on an outer peripheral surface of the drum. The photosensitive drum 71 is rotated at a constant speed by the power transmitted from the driving mechanism.

The cleaner 72 includes a blade 721 that comes into contact with a surface of the photosensitive drum 71. The cleaner 72 removes the toner remaining on the surface of the photosensitive drum 71 by using the blade 721.

The charging unit 73 is a device that uniformly charges the surface of the photosensitive drum 71. For example, the charging unit 73 charges the photosensitive drum 71 to a uniform negative potential by applying a grid bias voltage output from a grid electrode 731 to the photosensitive drum 71. The charging unit 73 is also referred to as a charger.

The exposing device 74 includes a plurality of light emitting elements. The light emitting element is, for example, a laser diode (LD), a light emitting diode (LED), an organic EL (OLED), or the like. The plurality of light emitting elements are arranged in a main scanning direction, which is a direction parallel to a rotation axis of the photosensitive drum 71. Then, each light emitting element is configured so as to irradiate one point on the photosensitive drum 71 with light.

The exposing device 74 forms one line of the latent image on the photosensitive drum 71 by irradiating the surface of the charged photosensitive drum 71 with light from the plurality of light emitting elements arranged in the main scanning direction. Further, the exposing device 74 forms a plurality of lines of the latent image by continuously irradiating the rotating photosensitive drum 71 with light.

The developing device 75 is a device that adheres the toner to the photosensitive drum 71. The developing device 75 includes a developer container 81, a stirring mechanism 82, a developing roller 83, a doctor blade 84, an auto toner control (ATC) sensor 85, and the like.

The developer container 81 is a container that contains a developer containing toner and a carrier. The developer container 81 receives the toner delivered from the toner cartridge 2 by the toner delivery mechanism 52. The carrier is contained in the developer container 81 during the manufacturing of the developing device 75.

The stirring mechanism 82 exists inside the developer container 81. The stirring mechanism 82 stirs the toner and the carrier in the developer container 81.

The developing roller 83 adheres the developer to the surface of the roller by rotating in the developer container 81.

The doctor blade 84 is a member arranged at a predetermined interval separated from the surface of the developing roller 83. The doctor blade 84 removes a portion of the developer adhering to the surface of the rotating developing roller 83. Accordingly, a layer of a developer having a thickness corresponding to the interval between the doctor blade 84 and the surface of the developing roller 83 is formed on the surface of the developing roller 83.

The ATC sensor 85 is, for example, a magnetic flux sensor having a coil and detecting a voltage value generated in the coil. The detection voltage of the ATC sensor 85 changes depending on the density of the magnetic flux from the toner in the developer container 81. That is, the ATC sensor 85 detects the voltage according to the density ratio of the toner in the developer container 81 to the carrier. Such a density ratio is called a toner density. The system controller 13 can determine the toner density in the developer container 81 based on the detection voltage of the ATC sensor 85.

As described above, when the surface of the photosensitive drum 71 charged by the charging unit 73 is irradiated with light from the exposing device 74, the latent image is formed. After that, when the layer of the developer formed on the surface of the developing roller 83 in the developing device 75 approaches the surface of the photosensitive drum 71, the toner contained in the developer adheres to the latent image formed on the surface of the photosensitive drum 71. Accordingly, the toner image is formed on the surface of the photosensitive drum 71. That is, the exposing device 74 and the developing device 75 constitute a toner image forming unit 76.

The transfer unit 42 has a configuration in which the toner image formed on the surface of the photosensitive drum 71 is transferred to the printing medium P.

As illustrated in FIGS. 1 and 2, the transfer unit 42 includes, for example, a transfer belt 91, a secondary transfer facing roller 92, a plurality of primary transfer rollers 93, and a secondary transfer roller 94.

The transfer belt 91 is an endless belt wound around the secondary transfer facing roller 92 and a plurality of winding rollers. The back surface, which is the inner surface, of the transfer belt 91 is in contact with the secondary transfer facing roller 92 and the plurality of winding rollers, and the front surface, which is the outer surface, faces the photosensitive drum 71 of the processing unit 41.

The secondary transfer facing roller 92 conveys the transfer belt 91 by rotating with the power transmitted from the driving mechanism. The secondary transfer facing roller 92 rotates counterclockwise in FIG. 1. Due to this rotation, the transfer belt 91, which is an endless belt, is conveyed so as to rotate counterclockwise in FIG. 1. The plurality of winding rollers are configured to be freely rotatable. The plurality of winding rollers rotate according to the movement of the transfer belt 91 by the secondary transfer facing roller 92.

The plurality of primary transfer rollers 93 are provided for the respective processing units 41. The plurality of primary transfer rollers 93 are provided so as to face the photosensitive drums 71 of the corresponding processing units 41. Specifically, the plurality of primary transfer rollers 93 are provided at positions facing the photosensitive drums 71 of the corresponding processing units 41 with the transfer belt 91 interposed therebetween. The primary transfer roller 93 is into contact with the inner peripheral surface side of the transfer belt 91 and displaces the transfer belt 91 toward the photosensitive drum 71. Due to this displacement, the surface of the transfer belt 91 is in contact with the photosensitive drum 71.

The secondary transfer roller 94 is provided at a position facing the secondary transfer facing roller 92. The secondary transfer roller 94 is in contact with the surface of the transfer belt 91 on which the peripheral surface of the secondary transfer facing roller 92 is conveyed and applies pressure. Due to this contact and pressure, a transfer nip in which the secondary transfer roller 94 and the surface of the transfer belt 91 are in close contact with each other is formed.

The secondary transfer roller 94 and the secondary transfer facing roller 92 rotate to convey the printing medium P supplied from the paper feed conveyance path 31 in a state of interposing the printing medium P. As a result, the printing medium P passes through the transfer nip. The secondary transfer roller 94 presses the printing medium P passing through the transfer nip against the surface of the transfer belt 91.

In the transfer unit 42 having the above-described configuration, when the surface of the transfer belt 91 comes into contact with the photosensitive drum 71, the toner image formed on the surface of the photosensitive drum 71 is transferred to the surface of the transfer belt 91. As illustrated in FIG. 1, when the image forming unit 17 includes the plurality of processing units 41, the toner images are transferred to the transfer belt 91 from the photosensitive drums 71 of the plurality of processing units 41, respectively. The toner image transferred to the surface of the transfer belt 91 is conveyed to the transfer nip by the transfer belt 91. At this time, when the printing medium P exists at the transfer nip, the toner image transferred to the surface of the transfer belt 91 is transferred to the printing medium P at the transfer nip. The transfer belt 91 is an example of an image carrier that moves in the first direction.

The image forming unit 17 includes the sensor unit 100. The sensor unit 100 is provided at a position facing the surface of the transfer belt 91 between the plurality of processing units 41 and the secondary transfer roller 94. The details of the sensor unit 100 will be described later.

Next, a configuration of main circuits of the image forming apparatus 1 will be described.

Figure 3:
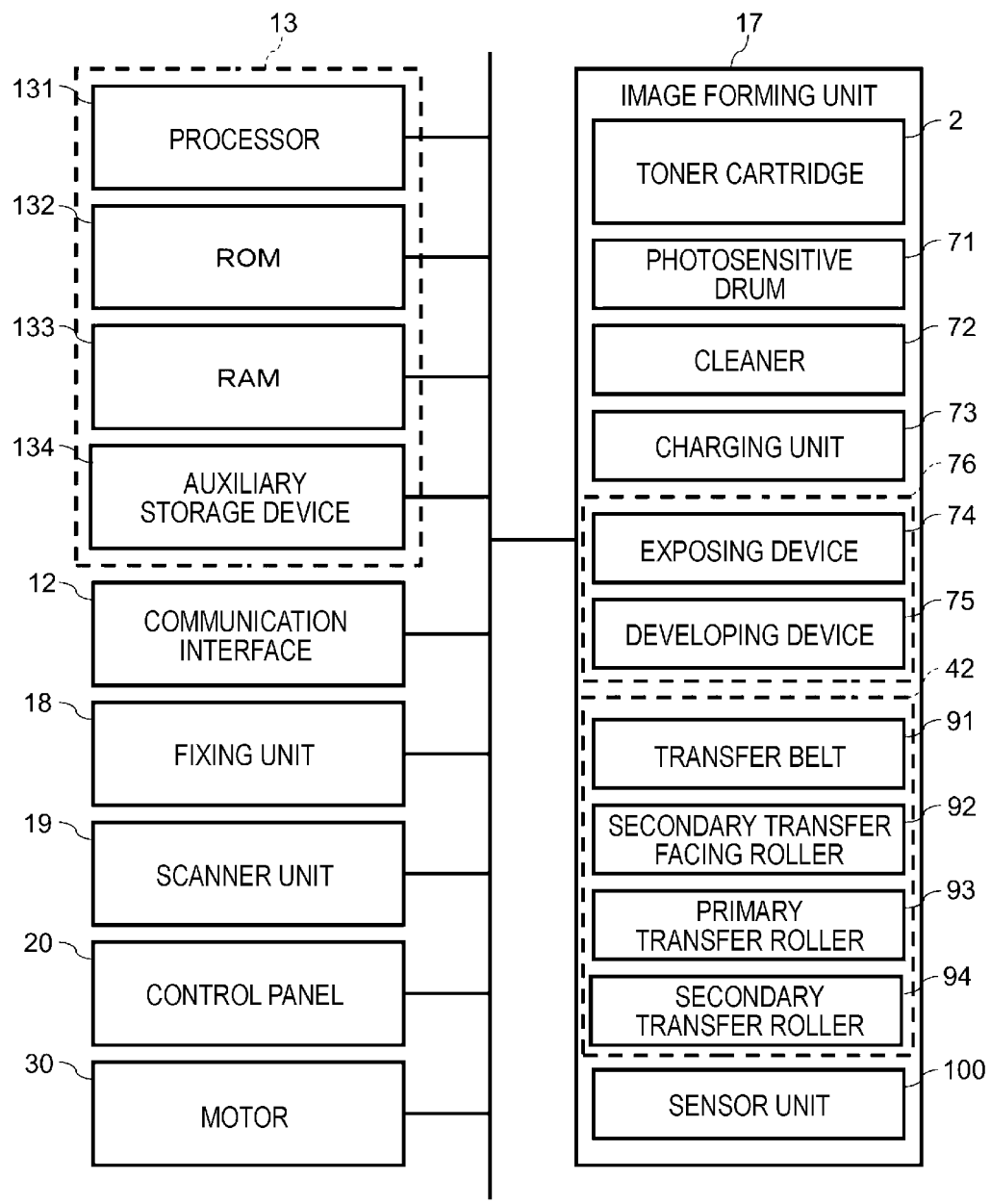
FIG. 3 is a block diagram illustrating a configuration of main circuits of the image forming apparatus.

FIG. 3 is a block diagram illustrating the configuration of main circuits of the image forming apparatus 1. As illustrated in the figure, in the image forming apparatus 1, a circuit is configured by connecting the communication interface 12, the image forming unit 17, the fixing unit 18, the scanner unit 19, the control panel 20, a motor 30, and the like to the system controller 13 by signal lines.

The system controller 13 includes a processor 131, a read only memory (ROM) 132, a random access memory (RAM) 133, and an auxiliary storage device 134. The system controller 13 constitutes a computer by connecting the processor 131, the ROM 132, the RAM 133, and the auxiliary storage device 134 with a signal line.

The processor 131 corresponds to a central portion of the computer. The processor 131 controls each unit so as to realize various functions as the image forming apparatus 1 according to the operating system or the application program. The processor 131 is, for example, a central processing unit (CPU).

The ROM 132 and the RAM 133 correspond to main storage portions of the computer. The ROM 132 is a non-volatile memory area, and the RAM 133 is a volatile memory area. The ROM 132 stores an operating system or application program. In addition, the ROM 132 stores data necessary for the processor 131 to execute a process for controlling each unit. The RAM 133 is used as a work area in which data is appropriately rewritten by the processor 131. The RAM 133 has a work area for storing, for example, image data.

The auxiliary storage device 134 corresponds to an auxiliary storage portion of the computer. As the auxiliary storage device 134, well-known storage devices such as an electric erasable programmable read-only memory (EEPROM), a hard disc drive (HDD), or a solid state drive (SSD) are used alone or in combination of two or more. The auxiliary storage device 134 stores data used by the processor 131 for performing various processes and data generated by the processes of the processor 131. The auxiliary storage device 134 may store the application program.

The system controller 13 connects each the toner cartridge 2, the photosensitive drum 71, the cleaner 72, the charging unit 73, the toner image forming unit 76 (the exposing device 74 and the developing device 75), and the transfer unit 42 (the transfer belt 91, the secondary transfer facing roller 92, the primary transfer roller 93, and the secondary transfer roller 94), and the sensor unit 100 of the image forming unit 17 by a signal line. Then, the system controller 13 controls each the toner cartridge 2, the photosensitive drum 71, the cleaner 72, the charging unit 73 and the toner image forming unit 76 provided for each processing unit 41, the transfer unit 42, and the fixing unit 18 to form an image on the printing medium P.

The motor 30 includes a first motor used for the driving mechanism that drives the conveying unit 16, a second motor used for the driving mechanism that rotates the photosensitive drum 71, and a third motor used for the driving mechanism that rotates the secondary transfer facing roller 92. The plurality of second motors are provided corresponding to the photosensitive drums 71 provided in the plurality of processing units 41. The motor 30 may include a motor used for a driving mechanism other than the above-described driving mechanisms. The motor 30 is, for example, a brushless motor. The motor 30 may be a brush motor.

Figure 4:
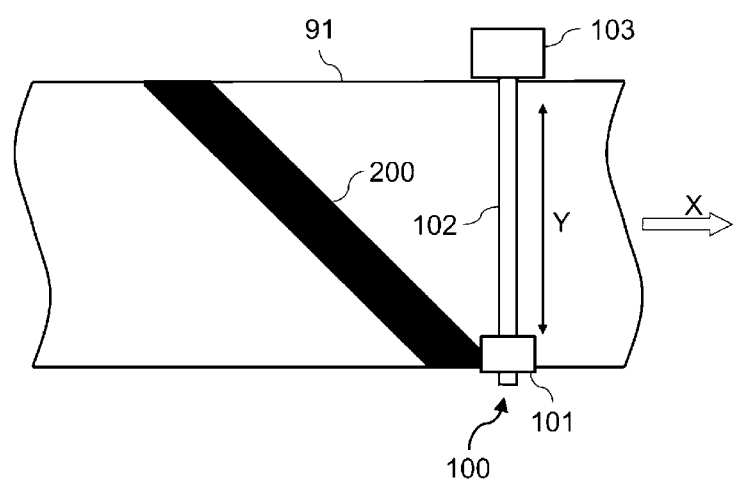
FIG. 4 is a schematic diagram illustrating details of a sensor unit.
Figure 5:
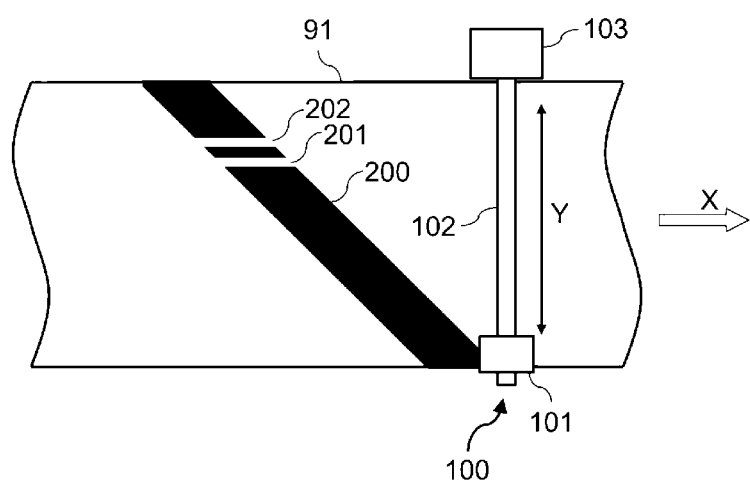
FIG. 5 is a schematic diagram illustrating the details of the sensor unit.

FIGS. 4 and 5 are schematic views illustrating the details of the sensor unit 100. As illustrated in FIGS. 4 and 5, the sensor unit 100 includes a sensor main body 101, a shaft 102, and a sensor driving mechanism 103. The sensor main body 101 includes a density sensor for detecting the toner density. The density sensor is, for example, a density sensor of an optical system including a light emitting element and a light receiving element. The density sensor may be a density sensor other than the optical system.

The sensor main body 101 is attached to the shaft 102. The shaft 102 is stretched from the one end to the other end of the transfer belt 91 in the second direction Y, which is the width direction of the transfer belt 91 perpendicular to the first direction X, which is the moving direction of the transfer belt 91. The sensor driving mechanism 103 is a mechanism for reciprocating the sensor main body 101 attached to the shaft 102 along the shaft 102. The sensor main body 101 sets one end of the transfer belt 91 as the home position. By the action of the sensor driving mechanism 103, the sensor main body 101 can move in parallel to the second direction Y from the one end to the other end of the transfer belt 91, which is the home position, along the surface of the transfer belt 91. Similarly, by the action of the sensor driving mechanism 103, the sensor main body 101 can move in parallel to the second direction Y from the other end to the one end of the transfer belt 91, which is the home position, along the same surface.

The sensor unit 100 detects a toner density of an inspection image 200 transferred from the processing unit 41 to the surface of the transfer belt 91. As illustrated in FIGS. 4 and 5, the inspection image 200 is a strip-shaped image inclined with respect to the second direction Y perpendicular to the first direction which is the moving direction of the transfer belt 91. Specifically, the inspection image 200 is a strip-shaped image inclined in the direction opposite to the first direction X from the one end to the other end of the second direction Y, which is the width direction of the transfer belt 91.

When the transfer belt 91 moves in the first direction X, first, one end of the strip-shaped inspection image 200 reaches the mounting position of the sensor unit 100. Then, the inspection image 200 passes through the mounting position of the sensor unit 100 to the other end as the transfer belt 91 moves. At this time, the sensor main body 101 detects the toner density while moving in the second direction Y from the one end to the other end in accordance with the movement of the inspection image 200 passing through the mounting position of the sensor unit 100. By doing so, the sensor main body 101 can detect the toner density of the inspection image 200 transferred to the transfer belt 91 from the one end to the other end.

The system controller 13 has a function of diagnosing from the toner density of the inspection image 200 detected by the sensor unit 100 whether or not there is an abnormality of the processing unit 41. For example, in some cases, when the caking occurs in the developer in the developer container 81, streak-shaped images 201 and 202 may be revealed in the inspection image 200 as illustrated in FIG. 5. The portions of the streak-shaped images 201 and 202 have toner densities lower than the other portions of the inspection image 200. The system controller 13 determines whether or not the streak-shaped images 201 and 202 are revealed in the inspection image 200 based on the toner density information provided by the sensor unit 100. When the system controller 13 detects that the streak-shaped images 201 and 202 are revealed, it is diagnosed that an abnormality such as caking occurs in the processing unit 41 that transfers the inspection image 200 to the surface of the transfer belt 91.

Figures 6, 7:
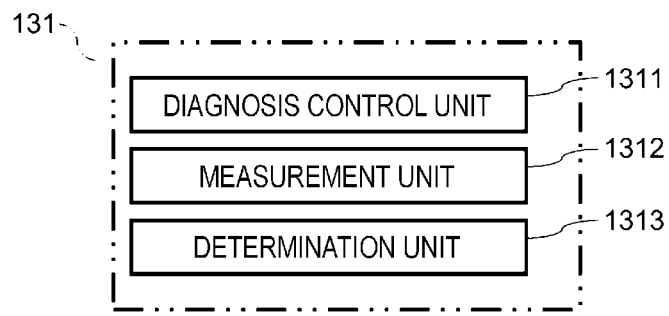
FIG. 6 is a schematic diagram illustrating a data structure of a data table.
FIG. 7 is a schematic diagram illustrating a function of a system controller.

In order to realize such a diagnosis function, the system controller 13 includes a data table 300 having a data structure illustrated in FIG. 6 on the RAM 133. The data table 300 is provided with an area for describing a toner density D in association with each of continuous line numbers Ln from "1" to "Lmax". The sensor main body 101 moves in the second direction Y while scanning the inspection image 200 line by line from the one end side to the other end side of the transfer belt 91. Then, the sensor main body 101 detects the toner density D of the scanning line each time the inspection image 200 is operated. In the data table 300, the toner density D of the scanning line is described in association with the line number Ln sequentially assigned to each scanning line.

In addition, as illustrated in FIG. 7, the system controller 13 is configured so that the processor 131 functions as a diagnosis control unit 1311, a measurement unit 1312, and a determination unit 1313. The functions of the diagnosis control unit 1311, the measurement unit 1312, and the determination unit 1313 are realized by a computer, of which main portion is the processor 131, executing information processing according to a diagnosis program. The diagnosis program is installed in the ROM 132 or the auxiliary storage device 134.

The method of installing the diagnosis program in the ROM 132 or the auxiliary storage device 134 is not particularly limited. The diagnosis program can be recorded on a removable recording medium, or the diagnosis program can be distributed by communication via a network to be installed in the ROM 132 or the auxiliary storage device 134. The recording medium may have any form of a CD-ROM, a memory card, and the like as long as the recording medium can store a program and a device can read the program.

FIGS. 8 to 11 are flowcharts illustrating main procedures of the information processing executed by the processor 131 according to the diagnosis program. Hereinafter, the functions of the diagnosis control unit 1311, the measurement unit 1312, and the determination unit 1313 will be described with reference to FIGS. 8 to 11. In addition, the procedure described below is an example. The procedure is not particularly limited as long as the same function can be obtained.

In ACT1, the processor 131 checks whether or not the number of times of printing N reaches the set number of times Nx. The system controller 13 includes a counter that counts up each time of forming an image on the printing medium P by the electrophotographic process. The number of times of printing N is the count value of this counter. The set number of times Nx is stored in the auxiliary storage device 134. The set number of times Nx is the number of times of printing that serves as a standard for diagnosing whether or not the caking occurs in the developer. The set number of times Nx is an example of setting conditions related to the caking of the developer. The set number of times Nx is uniquely set, for example, at the time of manufacturing the image forming apparatus 1. The set number of times Nx may be set to an any value in consideration of the usage environment such as the average temperature and the average humidity of the location where the image forming apparatus 1 is used. The set number of times Nx is, for example, 1000 times.

When the number of times of printing N reaches the set number of times Nx, the processor 131 determines YES in ACT1 and proceeds to ACT2. The processor 131 resets the diagnosis flag F to "0" in ACT2. The diagnosis flag F is 1-bit data in which the diagnosis flag F is set to "0" in the normal state and is set to "1" when the abnormality determination process described later is executed. The diagnosis flag F is stored in, for example, the RAM 133.

The processor 131 initializes a processing counter P to "0" in ACT3. The processing counter P is used for identifying the processing unit 41 that performs the diagnosis by the count value. In ACT4, the processor 131 counts up the processing counter P by "1". Then, in ACT5, the processor 131 checks whether or not the processing counter P exceeds the number of processing units 41. In the case of the image forming apparatus 1 according to the embodiment, the number of processing units 41 is "4".

When the processing counter P does not exceed the number of processing units 41, in ACT5, the processor 131 determines NO and proceeds to ACT6. In ACT6, the processor 131 executes the processing diagnosis process of the processing unit 41 specified by the count value of the processing counter P. Hereinafter, the processing unit 41 specified by the count value of the processing counter P is referred to as a diagnosis-target processing unit 41. The details of the processing diagnosis process will be described later.

In ACT7, the processor 131 waits for the completion of the processing diagnosis process. When the processing diagnosis process is completed, in ACT7, the processor 131 determines YES and returns to ACT4. The processor 131 further counts up the processing counter P by "1". When the processing counter P does not exceed the number of processing units 41, the processor 131 executes the processing diagnosis process of the processing unit 41 specified by the count value of the processing counter P, that is, the new diagnosis-target processing unit 41 different from the above-described diagnosis-target processing unit 41.

Until the processing counter P exceeds the number of the processing units 41, the processor 131 repeats the count-up of the processing counter P and the processing diagnosis process for the processing unit 41 specified by the count value of the processing counter P. Then, when the processing counter P exceeds the number of processing units 41, in ACT5, the processor 131 determines YES and proceeds to ACT8. In ACT8, the processor 131 initializes the counter that counts the number of times of printing N to "0". Then, the processor 131 completes the information processing of the procedure illustrated in the flowchart of FIG. 8.

Figure 9:
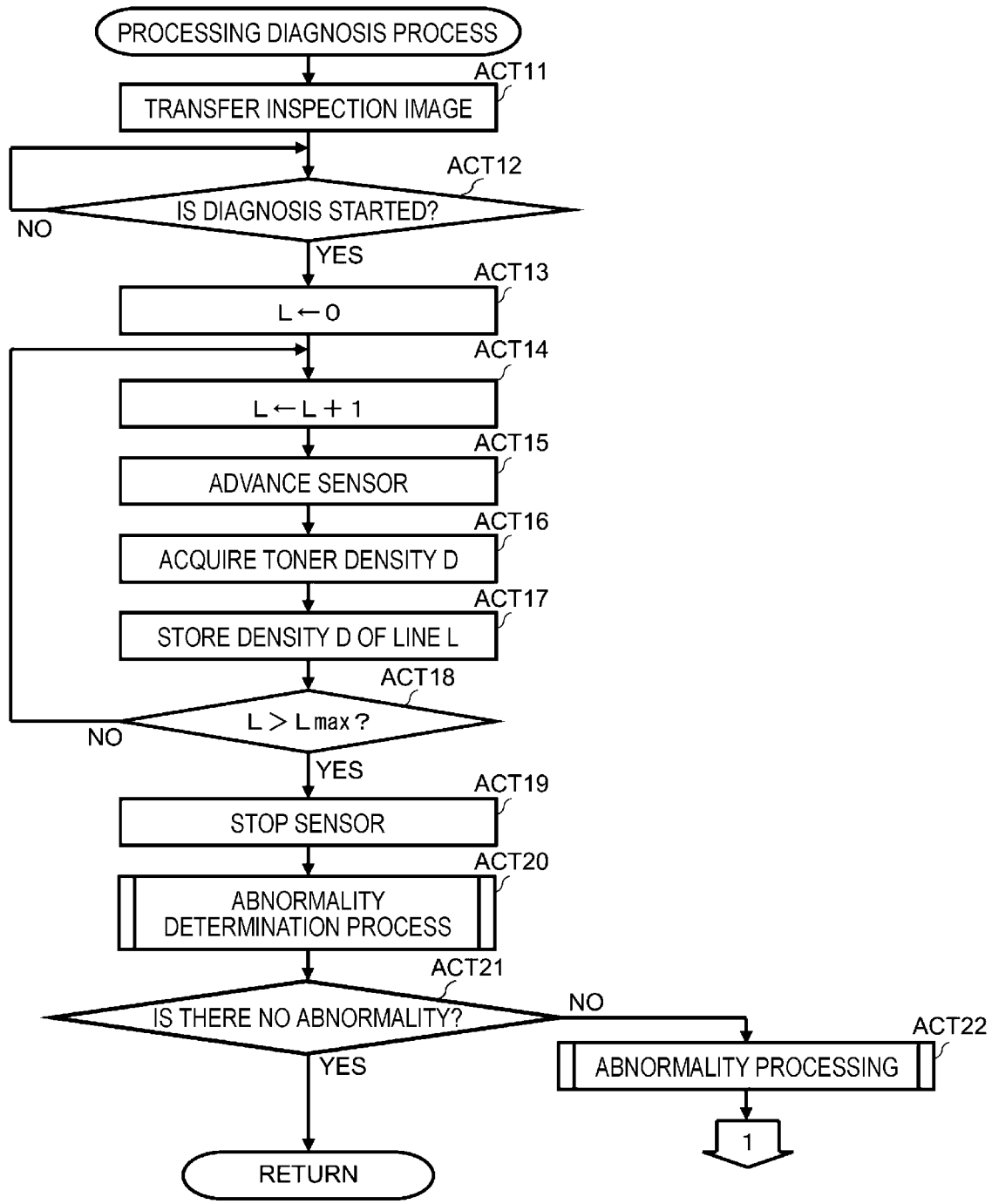
FIG. 9 is a flowchart specifically illustrating a procedure of a processing diagnosis process for a diagnosis-target processing unit.

FIG. 9 is a flowchart specifically illustrating a procedure of the processing diagnosis process for one diagnosis-target processing unit 41. The processor 131 sequentially executes the processing diagnosis processes of the procedure illustrated in the flowchart of FIG. 9 for the plurality of processing units 41.

When entering the processing diagnosis process, in ACT11, the processor 131 controls the diagnosis-target processing unit 41 to transfer the inspection image 200 to the transfer belt 91. The image data of the inspection image 200 is stored in, for example, the auxiliary storage device 134. The processor 131 provides the image data to the image forming unit 17. Accordingly, in the diagnosis-target processing unit 41, by performing each of the charging, exposing, and developing processes on the surface of the photosensitive drum 71 and performing the transferring process on the transfer belt 91, the inspection image 200 is transferred to the transfer belt 91.

Therefore, when the diagnosis-target processing unit 41 is a processing unit corresponding to the toner ink "yellow", the strip-shaped inspection image 200 painted with a single color "yellow" is transferred to the surface of the transfer belt 91. When the diagnosis-target processing unit 41 is a processing unit corresponding to the toner ink "magenta", the strip-shaped inspection image 200 painted with a single color "magenta" is transferred to the surface of the transfer belt 91. When the diagnosis-target processing unit 41 is a processing unit corresponding to the toner ink "cyan", the strip-shaped inspection image 200 painted with a single color "cyan" is transferred to the surface of the transfer belt 91. When the diagnosis-target processing unit 41 is a processing unit corresponding to the toner ink "black", the strip-shaped inspection image 200 painted with a single color "black" is transferred to the surface of the transfer belt 91.

In ACT12, the processor 131 waits for the timing of starting diagnosis. For example, when the diagnosis-target processing unit 41 is a processing unit corresponding to the toner ink "yellow", the time required for the leading edge of the inspection image 200 transferred to the transfer belt 91 by the diagnosis-target processing unit 41 to reach the mounting position of the sensor unit 100 can be obtained by using the distance from the diagnosis-target processing unit 41 to the mounting position of the sensor unit 100 and the speed of the transfer belt 91. After the inspection image 200 is transferred to the transfer belt 91 by the diagnosis-target processing unit 41, the time required for the leading edge of the inspection image 200 to reach the mounting position of the sensor unit 100 is the waiting time until starting diagnosis.

The processor 131 waits for this waiting time to elapse. When the waiting time elapses, in ACT12, the processor 131 determines YES and proceeds to ACT13. In ACT13, the processor 131 initializes the line counter L to "0". The line counter L counts the number of scanning lines of the sensor main body 101.

In ACT14, the processor 131 counts up the line counter L by "1". Then, in ACT15, the processor 131 controls the sensor driving mechanism 103 so that the sensor main body 101 advances by the width of the scanning line. By this control, the sensor driving mechanism 103 moves the sensor main body 101 located on the one end side of the transfer belt 91 to the other end side by the width of one scanning line along the shaft 102.

In ACT16, the processor 131 acquires the toner density D detected by the sensor main body 101. Then, in ACT17, the processor 131 describes the toner density D in the area associated with the line number Ln of the data table 300. The line number Ln is a count value of the line counter L.

In ACT18, the processor 131 checks whether or not the line counter L exceeds the maximum value "Lmax" of the line number. The maximum value "Lmax" is the maximum number of scanning lines required for the sensor main body 101 to detect the toner density of the inspection image 200 transferred from the one end to the other end of the second direction Y, which is the width direction of the transfer belt 91. The width of the scanning line may not necessarily match the width of one line of the image data. The width of the scanning line may be a width of a line thinner than the width of one line of the image data or may be a width of a line thicker than the width of one line of the image data. The width of the scanning line may match the width of one line of the image data.

If the line counter L does not exceed the maximum value "Lmax", in ACT18, the processor 131 determines NO and returns to ACT14. The processor 131 counts up the line counter L by "1" and controls the sensor driving mechanism 103 so that the sensor main body 101 advances by the width of the scanning line. Then, the processor 131 describes the toner density D detected by the sensor main body 101 in the area associated with the line number Ln of the data table 300.

After that, the processor 131 repeatedly executes the processes of ACT14 to ACT17 in the same manner as described above until the line counter L exceeds the maximum value "Lmax". Then, when the line counter L exceeds the maximum value "Lmax", in ACT18, the processor 131 determines YES and proceeds to ACT19. In ACT19, the processor 131 controls the sensor driving mechanism 103 so that the sensor main body 101 stops. By this control, the sensor driving mechanism 103 returns the sensor main body 101, which moves from the one end side to the other end side of the transfer belt 91 along the shaft 102, in the opposite direction and stops the sensor main body 101 at the home position.

In ACT20, the processor 131 executes the abnormality determination process. The abnormality determination process is a process that determines based on the toner density of the inspection image 200 whether or not there is an abnormality of the diagnosis-target processing unit 41. The details of the abnormality determination process will be described later.

When the abnormality determination process is completed, in ACT21, the processor 131 checks whether or not the diagnosis-target processing unit 41 is determined to have no abnormality. When it is determined that there is no abnormality, in ACT21, the processor 131 determines YES and completes the processing diagnosis process for one diagnosis-target processing unit 41.

When the diagnosis-target processing unit 41 is determined to have an abnormality, in ACT21, the processor 131 determines NO and proceeds to ACT22. In ACT22, the processor 131 executes the abnormality processing. This abnormality processing will also be described later. When the processor 131 completes the abnormality processing, the processor 131 completes the processing diagnosis process for one diagnosis-target processing unit 41.

Figure 8:
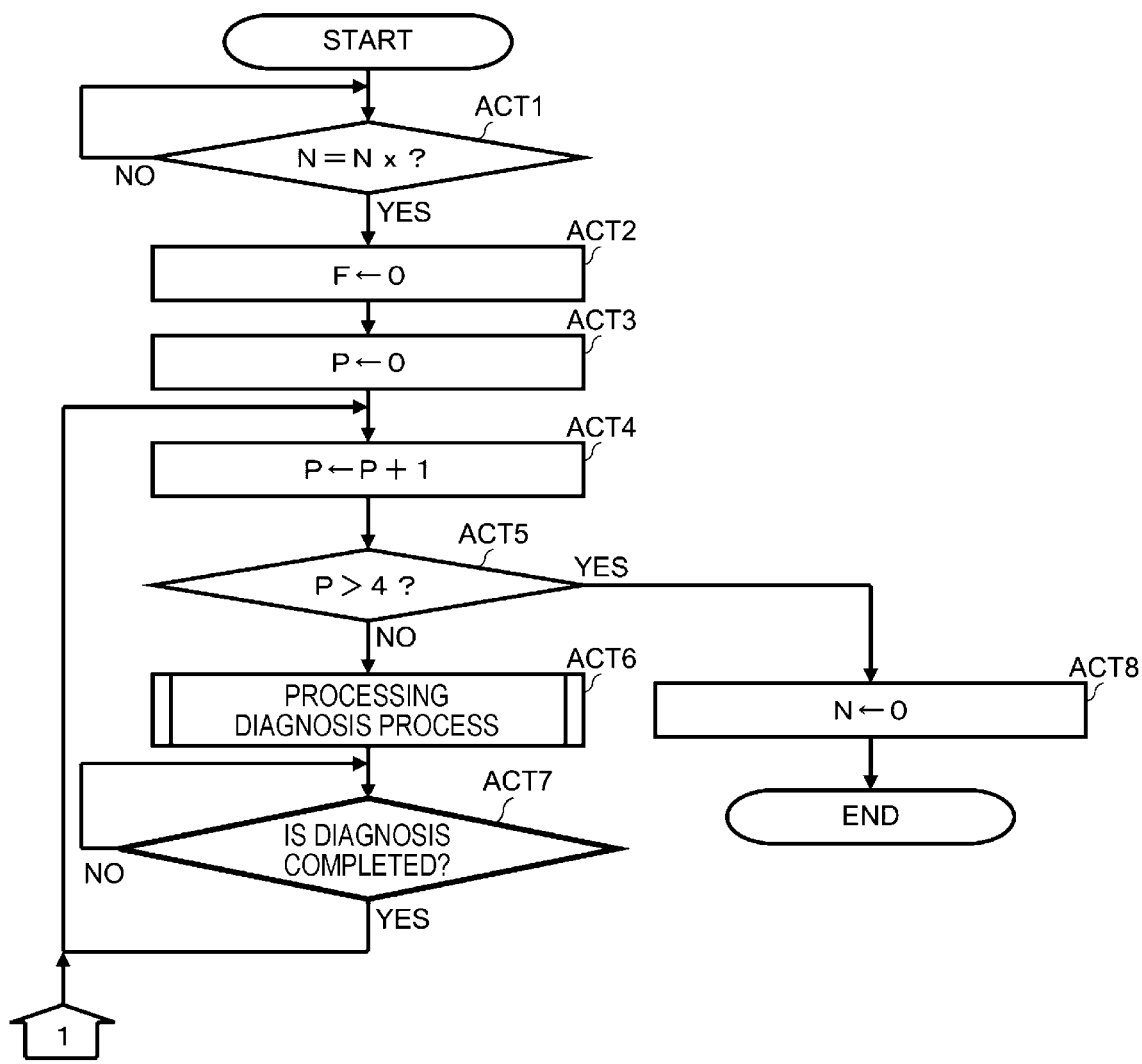
FIG. 8 is a flowchart illustrating a main procedure of information processing executed by a processor according to a diagnosis program.

Herein, the processor 131 functions as the diagnosis control unit 1311 by executing the processes of ACT1 to ACT5 of FIG. 8 and the processes of ACT11 to ACT19 of FIG. 9. That is, when the setting conditions related to the caking of the developer are satisfied, the processor 131 controls the developing device 75 and the like of the diagnosis-target processing unit 41 to form the inspection image 200 on the surface of the transfer belt 91 which is an image carrier. The inspection image 200 is a strip-shaped image inclined with respect to the second direction Y perpendicular to the first direction X, which is the moving direction of the transfer belt 91. The processor 131 allows the density difference occurring in the inspection image 200 to be detected by controlling the sensor unit 100 which is a detector.

As described above, in the image forming apparatus 1, when the setting conditions related to the caking of the developer are satisfied, the processing units 41 sequentially become the diagnosis-target processing unit 41. Then, the inspection image 200 is transferred to the surface of the transfer belt 91 by the action of the diagnosis-target processing unit 41. Furthermore, the toner density of the inspection image 200 is detected by the action of the sensor unit 100. Then, it is determined based on the toner density of the inspection image 200 whether or not there is an abnormality in which the streak-shaped images 201 and 202 are revealed in the image forming process of the diagnosis-target processing unit 41.

Figure 10:
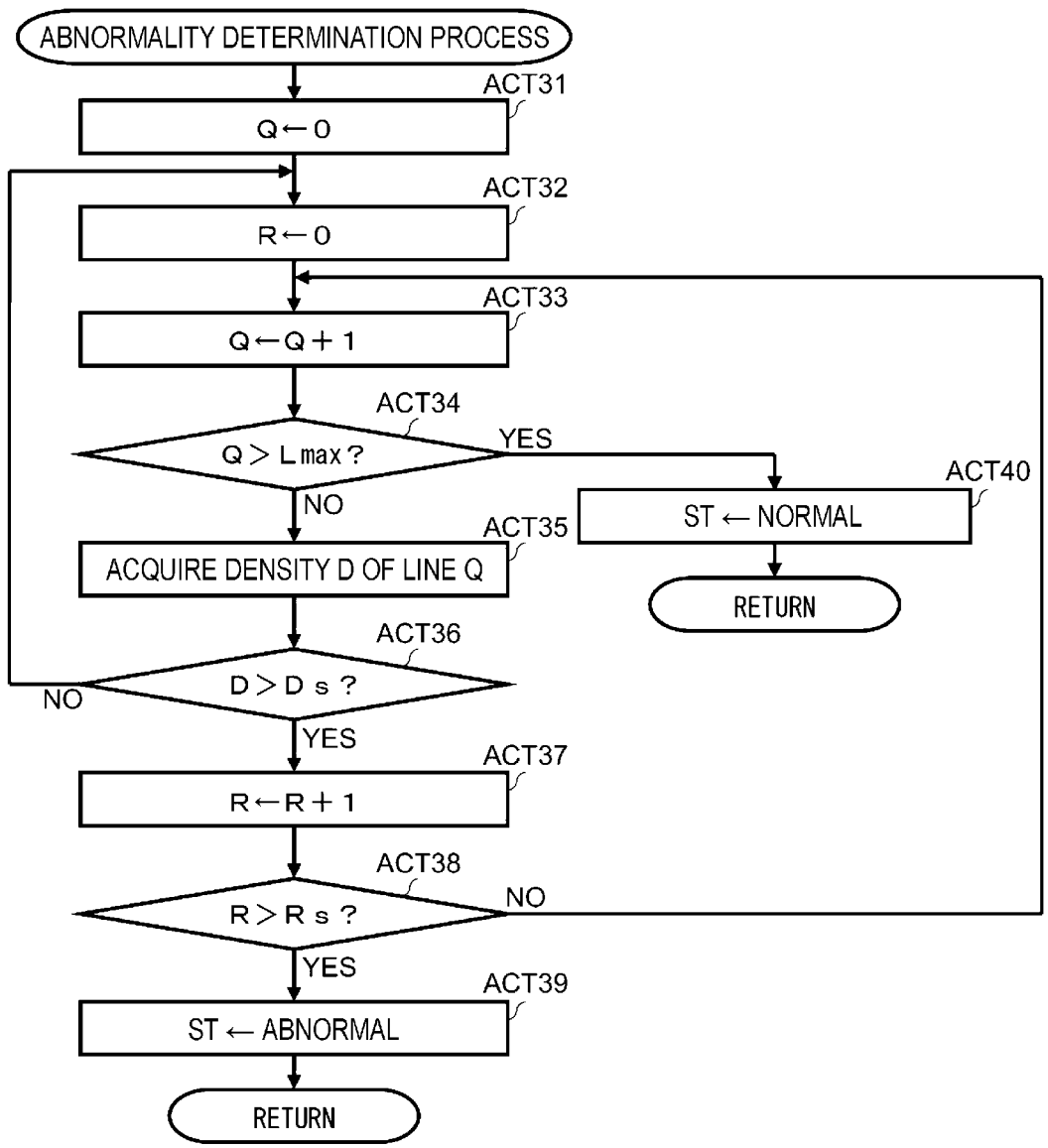
FIG. 10 is a flowchart specifically illustrating a procedure of an abnormality determination process.

FIG. 10 is a flowchart specifically illustrating the procedure of the above-described abnormality determination process. When entering the abnormality determination process, in ACT31, the processor 131 initializes a determination line counter Q to "0". In addition, in ACT32, the processor 131 initializes an abnormality line counter R to "0". The determination line counter Q counts the line number of the scanning line for determining whether or not there is an abnormality. The abnormality line counter R continuously counts the number of scanning lines determined to have an abnormality.

In ACT33, the processor 131 counts up the determination line counter Q by "1". Then, in ACT34, the processor 131 checks whether or not the determination line counter Q exceeds the maximum value "Lmax" of the line number. When the determination line counter Q does not exceed the maximum value "Lmax", in ACT34, the processor 131 determines NO and proceeds to ACT35.

In ACT35, the processor 131 acquires the toner density D stored in association with the line number Ln that matches the count value of the determination line counter Q from the data table 300. In ACT36, the processor 131 checks whether or not the toner density D is smaller than the first threshold value Ds. The first threshold value Ds is a value sufficiently smaller than the toner density of the inspection image 200 transferred to the transfer belt 91 by the diagnosis-target processing unit 41. The first threshold value Ds is stored in the auxiliary storage device. When the toner density D is below the first threshold value Ds, it is assumed that the toner is not sufficiently transferred in the inspection image 200 scanned by the scanning line of the line number Ln.

When the toner density D is equal to or higher than the first threshold value Ds, in ACT36, the processor 131 determines NO and returns to ACT32. The processor 131 executes the processes subsequent to ACT32 in the same manner as described above.

When the toner density D is below the first threshold value Ds, in ACT36, the processor 131 determines YES and proceeds to ACT37. In ACT37, the processor 131 counts up the abnormality line counter R by "1". In ACT38, the processor 131 checks whether or not the abnormality line counter R exceeds a second threshold value Rs. The second threshold value Rs is the number of scanning lines sufficient to determine that the streak-shaped images 201 and 202 are revealed because the toner is not sufficiently transferred. The second threshold value Rs is stored in the auxiliary storage device.

When the abnormality line counter R does not reach the second threshold value Rs, in ACT38, the processor 131 determines NO and returns to ACT33. The processor 131 executes the processes subsequent to ACT33 in the same manner as described above. At this time, when the toner density D is equal to or higher than the first threshold value Ds, the processor 131 returns to ACT32. That is, the processor 131 initializes the abnormality line counter R to "0". Then, the processor 131 executes the processes subsequent to ACT33 in the same manner as described above. On the other hand, when the toner density D is still below the first threshold value Ds, the processor 131 repeats the process of counting up the abnormality line counter R by "1".

In this manner, the processor 131 counts up the abnormality line counter R by "1" during the detecting of the scanning line of which toner density D is lower than the first threshold value Ds. Then, when the abnormality line counter R reaches the second threshold value Rs, in ACT38, the processor 131 determines YES and proceeds to ACT39. In ACT39, the processor 131 sets the status indicating the state of the diagnosis-target processing unit 41 to "abnormal".

On the other hand, when the determination line counter Q exceeds the maximum value "Lmax" of the line number with the abnormality line counter R not reaching the second threshold value Rs, in ACT34, the processor 131 determines YES and proceeds to ACT40. In ACT40, the processor 131 sets the status indicating the state of the diagnosis-target processing unit 41 to "normal".

When the status of the diagnosis-target processing unit 41 is determined to be "normal" or "abnormal", the abnormality determination process is completed. When the abnormality determination process is completed, the processor 131 proceeds to ACT21 of FIG. 9. When the status of the diagnosis-target processing unit 41 is determined to be "normal", the processor 131 determines that there is no abnormality. When the status of the diagnosis-target processing unit 41 is determined to be "abnormal", the processor 131 determines that there is an abnormality.

Herein, the processor 131 functions as the measurement unit 1312 by executing the processes of ACT31 to ACT37 of FIG. 10. That is, the processor 131 measures the width of the streak-shaped image in which the density difference in the toner density detected by the sensor unit 100 is equal to or higher than the first threshold value Ds.

In addition, the processor 131 functions as the determination unit 1313 by executing the processes of ACT38 to ACT40 of FIG. 10. That is, when the width of the streak-shaped image measured by the measurement unit is equal to or higher than the second threshold value Rs, the processor 131 determines that there is an abnormality. When the streak-shaped image having a width equal to or higher than the second threshold value Rs is not detected, the processor 131 determines that there is no abnormality.

As described above, in the image forming apparatus 1, when a streak-shaped image having a density difference being equal to or higher than the first threshold value Ds occurs over a width being equal to or higher than the second threshold value Rs in the inspection image 200, the diagnosis-target processing unit 41 is determined to be abnormal. Then, when it is determined to be abnormal, the abnormality processing is executed.

Figure 11:
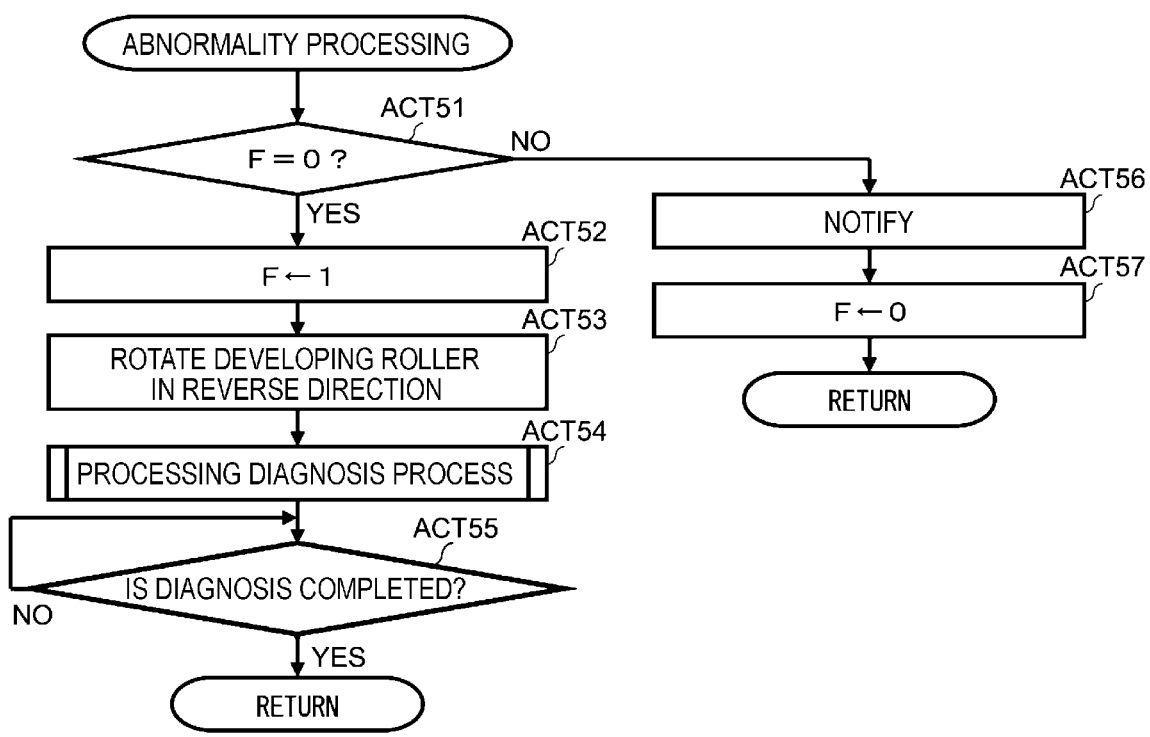
FIG. 11 is a flowchart specifically illustrating a procedure of abnormality processing.

FIG. 11 is a flowchart specifically illustrating a procedure of the above-described abnormality processing. When entering the abnormality processing, in ACT51, the processor 131 checks whether or not the diagnosis flag F is "0". When the diagnosis flag F is "0", in ACT51, the processor 131 determines YES and proceeds to ACT52. In ACT52, the processor 131 sets the diagnosis flag F to "1".

In ACT53, the processor 131 controls the developing roller 83 of the developing device 75 in the diagnosis-target processing unit 41 to rotate in the reverse direction in the developer container 81. By this control, the developing roller 83 rotates in the reverse direction. Due to the reverse rotation of the developing roller 83, there is a possibility of removing the caking that occurs in the developer. In addition, when the developing roller 83 is rotated in the reverse direction, the speed may be constant, but a possibility of removing the caking is increased by changing the speed stepwise.

When the developing roller 83 is rotated in the reverse direction for a certain period of time, in ACT54, the processor 131 executes the processing diagnosis process for the diagnosis-target processing unit 41 in the same manner as described above. In ACT55, the processor 131 waits for the completion of the processing diagnosis process. When the processing diagnosis process is completed, in ACT55, the processor 131 determines YES and returns to ACT4 of FIG. 8.

Therefore, when the diagnosis-target processing unit 41 is determined to have no abnormality by the second processing diagnosis process, the processor 131 executes the processing diagnosis process for the next diagnosis-target processing unit 41. Alternatively, when the processing diagnosis process for all the processing units 41 is completed, the processor 131 initializes the counter that counts the number of times of printing N to "0" and completes the information processing of the procedure illustrated in the flowchart of FIG. 8.

On the other hand, when the diagnosis-target processing unit 41 is determined to have an abnormality even in the second processing diagnosis process, the processor 131 executes the abnormality processing again. In this case, since the diagnosis flag F is set to "1", in ACT51, the processor 131 determines NO and proceeds to ACT56.

In ACT56, the processor 131 notifies that the diagnosis-target processing unit 41 has an abnormality. Specifically, the processor 131 outputs information related to the abnormality to an external device connected through the network. The information includes information identifying the diagnosis-target processing unit 41, information on the memory 53 provided in the toner storage container 51 of the diagnosis-target processing unit 41, setting information of the image forming apparatus 1, and the like.

The information output to the external device is transmitted to, for example, a monitor of a service center via the Internet. Therefore, the service person of the service center can know from the information displayed on the monitor together with the information of the memory 53 and the setting information of the image forming apparatus 1 that an abnormality in which the streak-shaped images 201 and 202 are revealed occurs in the image forming apparatus 1. The information of the memory 53, the setting information of the image forming apparatus 1, and the like are utilized as information necessary for the maintenance of the processing unit 41 in which the abnormality occurs.

In ACT57, the processor 131 notifying that there is an abnormality resets the diagnosis flag F to "0". After that, the processor 131 returns to ACT4 of FIG. 8.

Herein, the processor 131 functions as the diagnosis control unit 1311 by executing the processes of ACT51 to ACT56 of FIG. 11. That is, when it is determined that an abnormality due to the caking or the like occurs in the diagnosis-target processing unit 41, the processor 131 rotates the developing roller 83 in the reverse direction. Then, the processor 131 again executes the processing diagnosis process and the abnormality determination process on the diagnosis-target processing unit 41. As a result, when the abnormality of the diagnosis-target processing unit 41 is not resolved, the processor 131 notifies the external device of the information related to the abnormality through the network.

As described above, in the image forming apparatus 1, when an abnormality due to the caking or the like occurs in the diagnosis-target processing unit 41, an operation for resolving the abnormality is automatically executed. Then, when the abnormality is resolved by this operation, the image forming apparatus 1 continues to perform the normal operation assuming that there is no abnormality. On the other hand, when the abnormality is not resolved, the external service center or the like is notified of the occurrence of the abnormality.

As described above in detail, the image forming apparatus 1 has a function of automatically diagnosing whether or not streak-shaped images 201 and 202 occur due to the caking of the developer or the like. Then, in that case, the diagnosis can be performed without stopping the transfer belt. Therefore, the time required for the diagnosis can be shortened.

In addition, during the diagnosis, the image forming apparatus 1 transfers the strip-shaped inspection image 200 inclined with respect to the second direction Y perpendicular to the first direction X, which is the moving direction of the transfer belt 91, to the surface of the transfer belt 91. Then, the image forming apparatus 1 detects the toner density of the inspection image 200 by using the sensor main body 101. At this time, the time required to detect the toner density is the time required for the sensor main body 101 to move from the one end to the other end of the transfer belt 91 in accordance with the moving speed of the transfer belt 91. Therefore, it is possible to obtain the effect of further shortening the time required for diagnosis. In addition, since the inspection image 200 may be strip-shaped, the amount of toner required for forming the inspection image 200 can be saved.

When the width at which the difference in toner density is equal to or higher than the first threshold value Ds is equal to or higher than the second threshold value Rs in the inspection image 200, the image forming apparatus 1 determines that the streak-shaped images 201 and 202 are generated. Therefore, since the streak-shaped images 201 and 202 can be reliably detected, the diagnosis can be performed with high accuracy.

When the streak-shaped images 201 and 202 are detected, the image forming apparatus 1 executes the reversing operation of the developing roller 83 in the diagnosis-target processing unit 41. Therefore, in some cases, when the streak-shaped images 201 and 202 occur due to the caking of the developer, the caking may be resolved by the reversing operation. As a result, since the image forming apparatus 1 is automatically repaired without the artificial repair work by a service person, the cost required for the repair work can be reduced.

In addition, if the caking is not resolved by the reversing operation, the external device is notified of the information related to the abnormality through the network. Therefore, it is possible to obtain the effect capable of allowing the service person to easily acquire the information required for performing the repair work.

In the above-described embodiment, a case where the plurality of processing units 41 are sequentially diagnosed is illustrated. In another embodiment, the plurality of processing units 41 are diagnosed at the same time.

Figure 12:
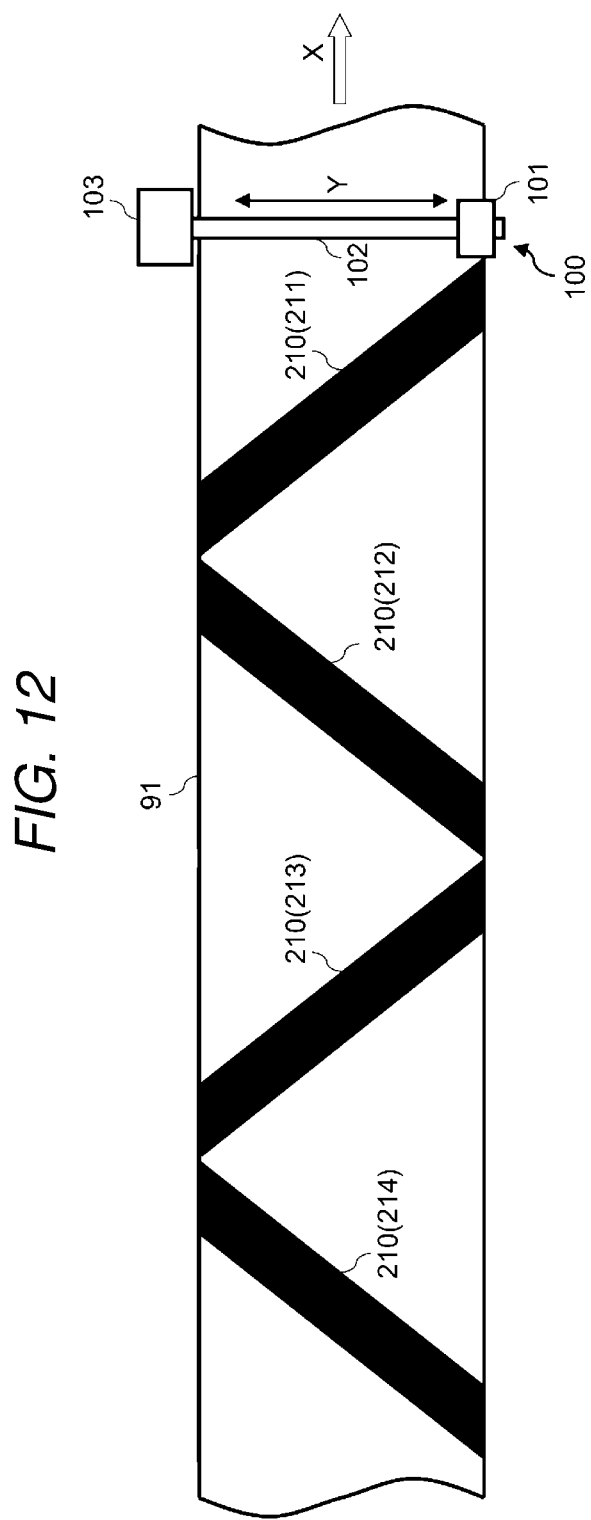
FIG. 12 is a schematic diagram illustrating an inspection image in the case of diagnosing four processing units at the same time.

FIG. 12 is a schematic view illustrating an inspection image 210 in the case of diagnosing four processing units 41 at the same time. The inspection image 210 includes a first inspection image 211, a second inspection image 212, a third inspection image 213, and a fourth inspection image 214.

The first inspection image 211 is the same as the inspection image 200 of the above-described embodiment. That is, the first inspection image 211 is a strip-shaped image inclined in the direction opposite to the first direction X, which is the moving direction of the transfer belt 91, from the one end to the other end of the second direction Y, which is the width direction of the transfer belt 91. Following the first inspection image 211, the second inspection image 212 is a strip-shaped image inclined in the direction opposite to the first direction X from the other end to the one end of the second direction Y. Following the second inspection image 212, the third inspection image 213 is a strip-shaped image inclined in the direction opposite to the first direction X from the one end to the other end of the second direction Y. Following the third inspection image 213, the fourth inspection image 214 is a strip-shaped image inclined in the direction opposite to the first direction X from the other end to the one end of the second direction Y.

With respect to such an inspection image 210, the sensor unit 100 operates as follows. First, the sensor main body 101 moves in the second direction Y from the one end to the other end in accordance with passing the first inspection image 211 through the mounting position of the sensor unit 100. Next, the sensor main body 101 moves in the second direction Y from the other end toward one end in accordance with passing the second inspection image 212 through the same mounting position. Next, the sensor main body 101 moves in the second direction Y from the one end to the other end in accordance with passing the third inspection image 213 through the same mounting position. Finally, the sensor main body 101 moves in the second direction Y from the other end toward one end in accordance with passing the fourth inspection image 214 through the same mounting position.

By such an operation, the sensor main body 101 can detect the toner density in order of the first inspection image 211, the second inspection image 212, the third inspection image 213, and the fourth inspection image 214. After that, normality or abnormality may be determined for each processing unit 41 in the same manner as in the above-described embodiment.

In the above-described embodiment, the transfer belt 91 is used as an example of the image carrier. The image carrier may be the photosensitive drum 71.

Figure 13:
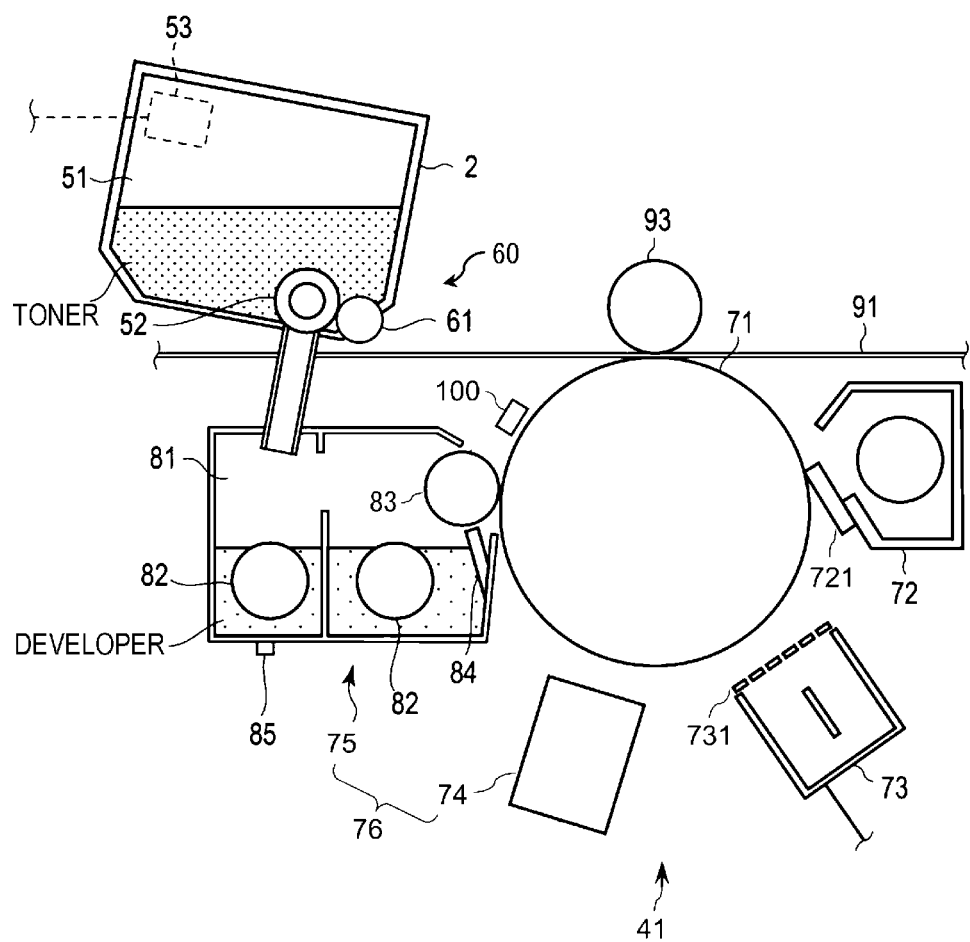
FIG. 13 is an explanatory diagram of another embodiment in which an image carrier is used as a photosensitive drum.

FIG. 13 is an explanatory diagram of another embodiment in which the image carrier is used as the photosensitive drum 71. In FIG. 13, the photosensitive drum 71 rotates clockwise. Therefore, the sensor unit 100 is provided between the developing device 75 and the primary transfer roller 93. The sensor unit 100 has a configuration in which the sensor main body 101 reciprocates from the one end to the other end in parallel to the axial direction of the photosensitive drum 71.

With such a configuration, the toner density of the inspection image formed on the surface of the photosensitive drum 71 can be detected by the charging, exposing, and developing processes on the photosensitive drum 71. Therefore, the normality or abnormality of the processing unit 41 can be diagnosed by executing the processing diagnosis process described above for the toner density of the inspection image.

In the above-described embodiment, the setting condition related to the caking of the developer is set to the setting number for the number of times of printing N. The setting conditions are not limited thereto. For example, the number of days may be set as a setting condition. Alternatively, the ambient temperature or humidity of the surroundings are measured, and the ambient temperature or humidity where the caking is likely to occur may be used as the setting condition.

While certain embodiments have been described, these embodiments have been presented by way of example only, and are not intended to limit the scope of invention. Indeed, the novel apparatus and methods described herein may be embodied in a variety of other forms; further, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus, comprising:
an image carrier that moves in a first direction;
a developing device that forms a strip-shaped image inclined with respect to a second direction perpendicular to the first direction on a surface of the image carrier by using a developer;
a detector that detects a density difference occurring in different portions of the strip-shaped image formed on the surface of the image carrier while moving in the second direction;
a determination component that determines based on a detection result of the detector whether or not an abnormality exists; and
a diagnosis controller that controls the developing device and the detector, wherein the diagnosis controller:
executes a first diagnostic process that causes the developing device to form the strip-shaped image and that causes the detector to detect the density difference occurring in the strip-shaped image, when a setting condition related to caking of the developer is satisfied;
reversely operates a developing roller that supplies the developer of the developing device to the image carrier, when the determination component determines that the abnormality exists; and
executes a second diagnostic process that causes the developing device to again form the strip-shaped image and that causes the detector to again detect the density difference occurring in the strip-shaped image, in response to reversely operating the developing roller.

2. The image forming apparatus according to claim 1, wherein
the strip-shaped image is an image inclined in a direction opposite to the first direction from one end to the other end of the image carrier in the second direction, and the detector detects the density difference occurring in the strip-shaped image while moving from the one end to the other end in the second direction.

3. The image forming apparatus according to claim 2, wherein
the detector moves from the one end of the surface of the image carrier to the other end in the second direction in accordance with a moving speed of the image carrier.

4. The image forming apparatus according to claim 2, wherein
the strip-shaped image comprises a first image inclined in the direction opposite to the first direction from the one end to the other end of the image carrier in the second direction and a second image inclined in the direction opposite to the first direction from the other end to the one end, and
the detector detects the density difference occurring in the first image while moving from the one end to the other end in the second direction and, subsequently, detects the density difference occurring in the second image while moving from the other end to the one end in the second direction.

5. The image forming apparatus according to claim 4, wherein
the detector reciprocates in the second direction in accordance with a moving speed of the image carrier.

6. The image forming apparatus according to claim 1, further comprising:
a measurement component that measures a width of a streak-shaped image in which the density difference detected by the detector is equal to or higher than a first threshold value, wherein
the determination component determines that the abnormality exists when the width of the streak-shaped image measured by the measurement component is equal to or higher than a second threshold value.

7. The image forming apparatus according to claim 1, wherein
when the determination component determines that the abnormality exists after executing the second diagnostic process, the diagnosis controller notifies an external device of information related to the abnormality through a network; and
when the determination component determines that there is no abnormality after executing the first diagnostic process, the diagnosis controller executes one or more other diagnostic processes for one or more other developing devices.

8. A method performed by an image forming apparatus, comprising:
moving an image carrier in a first direction;
forming a strip-shaped image inclined with respect to a second direction perpendicular to the first direction on a surface of the image carrier by using a developer;
detecting a density difference occurring in different portions of the strip-shaped image formed on the surface of the image carrier while moving in the second direction;
determining, based on a detection result, whether or not an abnormality exists;
executing a first diagnostic process that causes the forming the strip-shaped image and that causes the detecting the density difference occurring in the strip-shaped image, when a setting condition related to caking of the developer is satisfied;
reversely operating a developing roller that supplies the developer to the image carrier, when it is determined that the abnormality exists; and
executing a second diagnostic process that causes the forming the strip-shaped image to be repeated and that causes the detecting the density difference occurring in the strip-shaped image to be repeated, in response to the reversely operating the developing roller.

9. The method according to claim 8, wherein
the strip-shaped image is an image inclined in a direction opposite to the first direction from one end to the other end of the image carrier in the second direction, further comprising:
detecting the density difference occurring in the strip-shaped image while moving from the one end to the other end in the second direction.

10. The method according to claim 9, further comprising:
moving a detector from the one end of the surface of the image carrier to the other end in the second direction in accordance with a moving speed of the image carrier.

11. The method according to claim 9, wherein
the strip-shaped image comprises a first image inclined in the direction opposite to the first direction from the one end to the other end of the image carrier in the second direction and a second image inclined in the direction opposite to the first direction from the other end to the one end, further comprising:
detecting the density difference occurring in the first image while moving from the one end to the other end in the second direction and, subsequently, detecting the density difference occurring in the second image while moving from the other end to the one end in the second direction.

12. The method according to claim 8, further comprising:
measuring a width of a streak-shaped image in which the density difference detected by the detector is equal to or higher than a first threshold value; and
determining that the abnormality exists when the width of the streak-shaped image measured by the measurement component is equal to or higher than a second threshold value.

13. The method according to claim 8, further comprising:
when determining that the abnormality exists even after the developing roller is reversely operated, notifying an external device of information related to the abnormality through a network.

14. A development abnormality detection device, comprising:
a developing device that forms a strip-shaped image inclined with respect to a second direction perpendicular to a first direction on a surface of an image carrier that moves in the first direction by using a developer;
a detector that detects a density difference occurring in different portions of the strip-shaped image formed on the surface of the image carrier while moving in the second direction;
a determination component that determines, based on a detection result of the detector, whether or not an abnormality exists in using the developer; and a diagnosis controller that controls the developing device and the detector, wherein the diagnosis controller:
  executes a first diagnostic process that causes the developing device to form the strip-shaped image and that causes the detector to detect the density difference occurring in the strip-shaped image, when a setting condition related to caking of the developer is satisfied;
  reversely operates a developing roller that supplies the developer of the developing device to the image carrier, when the determination component determines that the abnormality exists; and
  executes a second diagnostic process that causes the developing device to again form the strip-shaped image and that causes the detector to again detect the density difference occurring in the strip-shaped image, in response to reversely operating the developing roller.

\* \* \* \* \*